Patented June 4, 1935

2,003,644

UNITED STATES PATENT OFFICE 2,003,644

BIOPHYSICAL PROCESS FOR PRESERVING AND CONSERVING FERMENTABLE LIQUIDS

Percy Charles Clifford and Joaquin Crespo y Garcia, Mexico, D. F., Mexico

No Drawing. Application October 29, 1932, Serial No. 640,325. In Mexico November 3, 1931

3 Claims. (Cl. 99—15)

The invention relates to a bio-physical process wherein a combination of different high and low temperatures, applied for short intervals for determined and alternate periods of time, is employed for conserving and preserving fermentable liquids. The process may be used for preserving and conserving all knids of liquids subject to a rapid, spontaneous or natural fermentation, caused by their own ferments or artificially produced by ferments introduced into them, such liquids comprising the different kinds of beers, wines, liquors, milk, fruit juices, such as grapes, oranges, lemons, strawberries, cherries, etc., and vegetable juices among which may be especially mentioned the juice extracted from the maguey and other Agaves, used as a beverage in subtropical and tropical countries, either in its natural state as extracted from the plant, or after fermentation has set in.

The physical and bio-mechanical process comprising the combination of different high and low temperatures, at intervals of time and temperature in one single continuous operation, has for its object to control, by means of such high and low temperatures, the fermentations of all fermentable liquids, and especially the primary fermentation in all fruit and Agave juices, and the secondary fermentation in the liquids that have already passed a primary fermentation. This new system consists in submitting the fermentable liquids to constant high and low temperatures, not progressive but alternated with intervals of time and temperatures, in a single continuous operation. By this means, the liquids possessing spontaneous fermentation, upon being subjected, for fixed periods of time, to this new process of fixed high and low and at the same time alternated temperatures, conserve or preserve, according to the kind of liquid, their nutritive parts, and principally without destroying the sugars or glucoses contained in them, and especially, as has been stated, those contained in the wines, fruit juices, Agave juices and milk, and even those contained in frothy liquors, beers and already fermented juices. This is not the case with other processes, and for this reason the acids derived from the ulterior fermentation of the said liquids, after this process prohibit all further evolution and biologically fix the liquids submitted to this new process.

We wish to make it clear that we do not sterilize, nor pasteurize, nor tyndallize, nor buddenize, as by sterilizing a liquid, it is rendered innocuous through its own sterilized condition, while the pasteurization consists in a continued and rapid application, with intervals of a determined time, of two fixed temperatures, one high and the other low, as established by the proper Pasteur, taking also into account that the liquids submitted to the pasteurization and after the process should be kept at a constant low temperature for their proper conservation. The tyndallization consists in the application of different fixed temperatures within discontinued periods of time, during which periods no operation whatever is effected; this process occupies three full days, with the object according to Tyndall himself, to kill the sporulates that have survived the first temperatures, producing at the end of the process a sterilization of the liquid. The buddenization, discovered by Budden, provides the addition of an antiseptic or conservative, such as peroxide of hydrogen. Contrary to these known conserving systems, the system invented by us and applied to all kinds of fermentable liquids is continuous, with a duration of not more than two or three hours, in one single continuous operation, with temperatures which are not progressive but comprise several high temperatures with intervals of several low temperatures varying according to the kind of liquid being treated.

As examples of fermentable liquids we cite the juices of the orange, pine-apple, grape, strawberry, etc., which on being extracted from the fruit are subjected immediately to this new process, avoiding thereby all contamination, and by not allowing them to remain in a stated repose for any length of time, thereby preventing any fermentation, by submitting these juices to the different high and low temperatures in one single continuous operation. In the already fermented liquids, such as frothy liquors, beers, Agave juices and others in which the secondary fermentation has already set in, this secondary fermentation is cut off and the product fixed for its conservation, without it being necessary to keep the product in cold storage, but at the same time conserving the organoleptic composition of the liquids.

For obtaining the high and low temperatures used in our bio-physical process of a combination of different high and low temperatures applied for short intervals, for fixed and alternate periods of time, in a single continuous operation, we may employ, for the high temperatures, the heated or superheated steam, heated or superheated water, gases, and especially heated or superheated dry air. For obtaining the low temperatures, we may use ammonia, brine or other refrigerating liquids, cold water, ice, and especially cold air. By combining both hot and cold temperatures, we obtain the desired alternate changes in temperature and the process is carried out in one continuous operation. The treatment of the liquids by our process can be effected in partly closed or hermetically closed receptacles, such at matrasses, bottles, barrels, coiled pipes, etc., or in open receptacles, such as fermenting tubs or casks.

Within the present process the temperature of the liquid may ascend even higher, and may descend gradually to a low temperature, according to the kind of liquid to be conserved or preserved, and this low temperature may again be raised by gradual and alternative periods of high and low temperatures to the former high temperature or even to a higher or a lower temperature.

Referring now particularly to the treatment by the present process of the maguey juice, it may be mentioned that in the unfermented juice the saccharomyces present in all Agaves and especially in "Agave Americana" is preserved, and that in the already fermented juice the secondary fermentation is cut off by this process, which secondary fermentation ordinarily takes place in the stomach of people absorbing a liquid in full fermentation.

What we claim is:

1. A bio-physical process for conserving or preserving fermentable liquids, which consists in subjecting the same to varying temperatures, raising and lowering alternatively high and low temperatures in ascending and descending scales, in one continuous operation and terminating such variations, with a fixed high or low temperature maintained for a determined period of time according to the kind of liquid being treated by the process.

2. A bio-physical process for conserving or preserving fermentable liquids, which consists in subjecting the liquids for short periods of time and with intervals of time, in one continuous operation, to high temperatures alternated with low temperatures, in ascending and descending scales with alternated but not progressive temperatures, maintaining each temperature during a determined period of time according to the kind of liquid being treated by the process.

3. A bio-physical process for conserving or preserving thereafter fermentable liquids, which consists in heating a liquid to a relatively high temperature for a determined period of time, and in lowering the temperature for a determined period of time, to a relatively low graduation, alternating thereafter with different high and low temperatures in ascending and descending scales, and finally fixing the temperature at a relatively high or relatively low temperature, in ascending and descending scales, until the initial temperature fixes the products so that they are conserved or preserved.

PERCY CHARLES CLIFFORD.
JOAQUIN CRESPO y GARCIA.